Feb. 9, 1926.   
F. HENKEL  
1,572,531  
WHEELBARROW  
Filed June 18, 1924
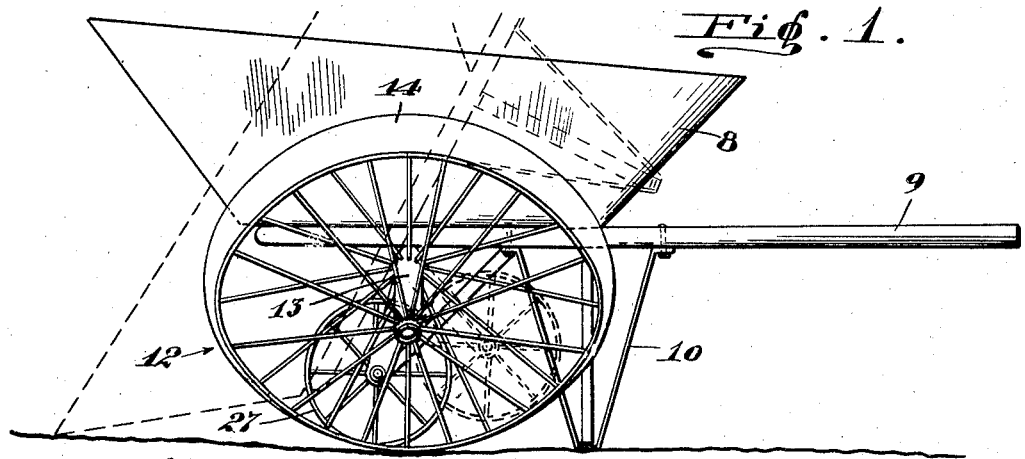
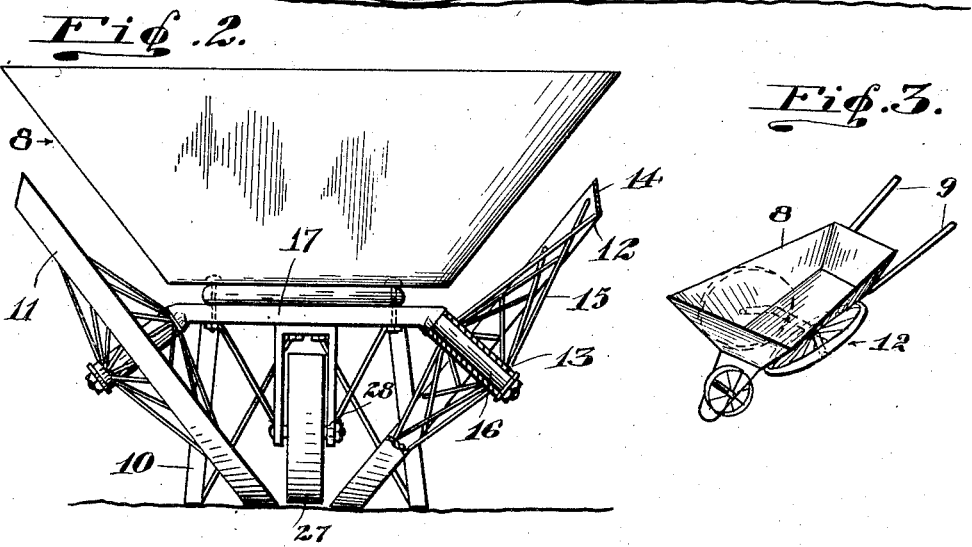
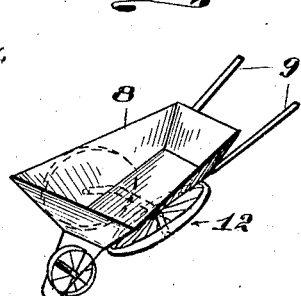
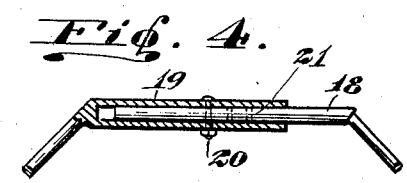
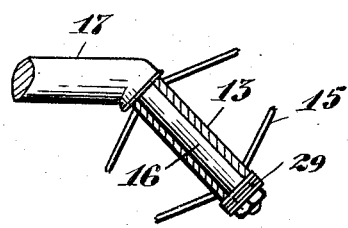
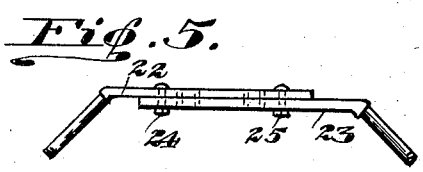
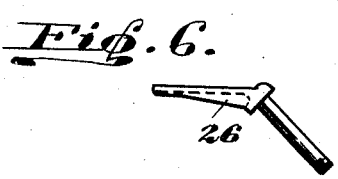
Inventor  
*Frederick Henkel;*  
By  
*R. S. Burry*  
Attorney Patented Feb. 9, 1926.

1,572,531

UNITED STATES PATENT OFFICE.

FREDERICK HENKEL, OF LONG BEACH, CALIFORNIA.

WHEELBARROW.

Application filed June 18, 1924. Serial No. 720,760.

*To all whom it may concern:*

Be it known that I, FREDERICK HENKEL, a citizen of the United States, residing at Long Beach, in the county of Los Angeles and State of California, have invented new and useful Improvements in Wheelbarrows, of which the following is a specification.

This invention particularly pertains to the wheel or running gear construction of wheelbarrows and the like, and has as its primary object the provision of a wheel arrangement for wheelbarrows whereby the advantages incident to mutiple wheels is attained without detracting from the desirable features of the single wheel as commonly employed.

Another object is to provide a wheelbarrow with an increased spread of wheel tread to afford stability.

Another object is to provide a wheelbarrow in which the load may be distributed to the front and rear of the vertical axis of the supporting wheels whereby the load carried by the operator will be reduced to a minimum.

Another object is to provide a novel wheel arrangement which can be applied to the ordinary wheelbarrow to increase its wheel base.

A further object is to provide a wheelbarrow in which both lateral and longitudinal dumping of the contents will be facilitated.

With the foregoing objects in view, together with such other objects and advantages as may subsequently appear, the invention resides in the parts and in the construction, arrangement, and combination of parts, as hereinafter described and claimed and illustrated by way of example in the accompanying drawing in which,—

Figure 1 is a side view of a wheelbarrow as constructed in accordance with the invention.

Figure 2 is a view of the wheelbarrow as seen in front elevation.

Figure 3 is a perspective view illustrating the invention as applied to the ordinary wheelbarrow.

Figure 4 is a detail in section illustrating a modified form of the wheelbarrow axle.

Figure 5 is a view in elevation of another modified form of the axle.

Figure 6 is a view in elevation showing a trunnion which may be employed in lieu of an axle.

Figure 7 is a view in section and elevation of the wheel spindle showing the manner of adjustably mounting the wheel thereon.

Referring to the drawing more specifically, 8 indicates the wheelbarrow body or tray which is fitted with the usual handles 9 and legs 10, and which parts may be of any suitable construction.

In carrying out my invention I provide a pair of wheels 11 and 12 which are arranged on the opposite sides of the tray and are set at an angle to each other so as to approach each other near the ground and spread at the top. The wheels are formed with the usual hub 13, felly 14, and spokes 15 connecting the hub and felly; the felly being preferably formed with its tread inclined so that when the wheel is disposed in a canted position the tread will extend parallel to the ground at its point of contact. The tread face may be either flat or curved transversely. The wheels 11 and 12 are revolubly mounted on downwardly inclined spindles or trunnions 16 which may be attached to the wheelbarrow frame or tray in any desired manner. In Figure 2 the spindles are shown as formed on a crossbar 17 integral therewith which cross-bar is secured to and carried by a frame formed in continuation of the handles 9. In some instances it may be desirable to mount the spindles so that they may be adjusted in various spaced relations to each other and to this end the spindles may be formed on separate members which may be adjusted longitudinally of each other, such for example as shown in Figure 4, in which 18 indicates a bar on which one of the spindles is mounted and 19 designates a tube carrying the other spindle, and which tube and bar are adapted to telescope and are secured together in various adjusted positions by means of a bolt 20 which passes through the tube 19 and is adapted to extend through any one of a number of openings 21 in the bar 18.

Another form of mounting of the spindles is shown in Figure 5 in which 22 and 23 indicate a pair of bars carrying the spindles and which bars are adapted to extend longitudinally of each other and are connected together by means of bolts 24 and 25 passing through apertures in the bars there being a series of apertures in each bar adapted to register with apertures in the other bar whereby the rods 22 and 23 may be secured together at various longitudinal positions relative to each other. In some instances it may be desirable to mount the spindles directly to the wheelbarrow body or frame independent of each other in which event the construction in Figure 6 may be employed, in which the spindle is formed on a bracket 26 of suitable design which may be secured to the wheelbarrow tray or frame in any desired manner.

The canted wheels 11 and 12 are spaced apart at their point of contact with the ground, and interposed between the canted wheels is a third wheel 27 of lesser diameter than the canted wheels, the axis of which is preferably arranged on a vertical plane extending a short distance forward of the plane of the axes of the canted wheel so that when the wheelbarrow is rocked forward on the axes of the wheels 11 and 12 the third wheel 27 will be moved rearwardly a short distance whereby it will be positioned to bear on the ground substantially intermediate the point of contact of the tread portions of the canted wheels. The third wheel 27 is here shown as carried by a yoke 28 which may be secured to the under side of the wheelbarrow, in any desired manner.

In the constructions shown in Figures 1 and 2 the canted wheels 11 and 12 and the third wheel 27 are arranged substantially intermediate the ends of the wheelbarrow tray 8 so that the load of the wheelbarrow will be substantially balanced on the axis thereby minimizing the load carried by the operator.

The invention is adapted to be applied to the ordinary wheelbarrow and may be used in conjunction with the usual single wheel as shown in Figure 3; the canted wheels being disposed rearward of the single wheel.

With this arrangement the load may be carried on either the single wheel or the canted wheels or both, as occasion may require. In some instances it may be desirable to adjust the wheels on the spindles, in which event the spindles may be formed of such length relative to the wheel hub that shim washers 29 may be interposed between either end of the wheel hub and the usual abutments provided on the spindle, as shown in Figure 7.

By thus arranging the canted wheels 11 and 12, a relatively wide wheel base or tread is afforded, and which, by reason of the wheels being inclined, will permit ready dumping of the wheelbarrow to either side. By mounting the wheels intermediate the ends of the wheelbarrow tray, forward or end dumping of the wheelbarrow is facilitated.

This application is a continuation in part of my application for wheelbarrows, filed September 22, 1923, Serial Number 664,207.

I claim—

1. In a wheelbarrow, a pair of inclined wheels set at an angle to each other so as to approach each other near the ground and spread at the top, and a third wheel arranged to contact the ground on a line extending intermediate the point of contact of the tread portions of said inclined wheels.

2. In a wheelbarrow, a pair of inclined wheels set at an angle to each other so as to approach each other near the ground and spread at the top, and a third wheel of a lesser diameter than the inclined wheels arranged intermediate said wheels with its tread portion adapted to contact the ground close to the point of contact with the ground of the tread portions of said inclined wheels.

FREDERICK HENKEL.